Jan. 7, 1969   J. L. BOOKER ET AL   3,420,619
RECOVERY OF OXIDES OF MOLYBDENUM FROM THE OXYCHLORIDE
Filed Feb. 4, 1966

INVENTORS.
James L. Booker
Robert E. Fredrickson
BY
C.U.Carlin
ATTORNEY

United States Patent Office 3,420,619
Patented Jan. 7, 1969

3,420,619
RECOVERY OF OXIDES OF MOLYBDENUM FROM THE OXYCHLORIDE
James L. Booker, Angleton, and Robert E. Fredrickson, Lake Jackson, Tex., assignors to The Dow Chemical Company, Midland, Mich., a corporation of Delaware
Filed Feb. 4, 1966, Ser. No. 525,210
U.S. Cl. 23—21    3 Claims
Int. Cl. C01g 1/02; C01g 39/00

ABSTRACT OF THE DISCLOSURE

The method of recovering molybdenum oxides in substantially pure form from molybdenum oxychloride comprising heating said oxychloride at a temperature between about 15° C. and about 130° C. at a reduced pressure of not over about one-half atmosphere positive pressure for a time sufficient to decompose the molybdenum-oxychloride to molybdenum oxides and HCl vapor, removing the HCl vapor, and retaining the molybdenum oxides as a particulate solid. The molybdenum oxychloride may be prepared by known methods, e.g. by crushing and roasting molybdenum ore to convert the molybdenum values therein to impure oxides, hydrochlorinating the roasted ore as by passing HCl therethrough to yield a vaporized molybdenum oxychloride, and condensing the oxychloride as produced.

---

Figure 1:
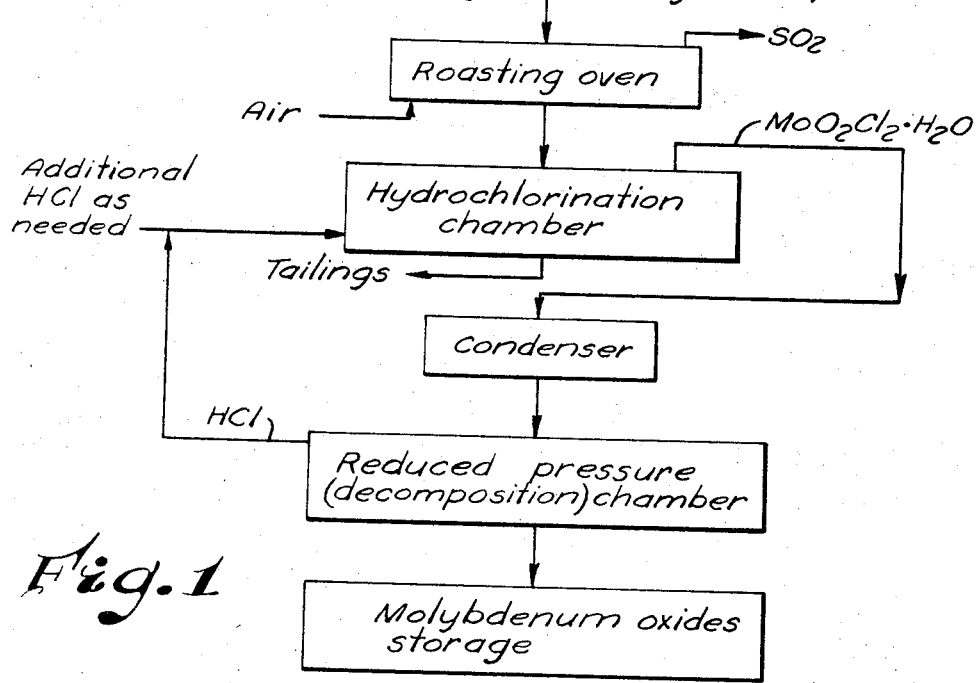

The invention is concerned with the production of molybdenum oxides, particularly with the recovery of $MoO_3$ from an ore which may be largely molybdenite but which also may contain some molybdenum values as oxides.

Molybdenum is widely used, particularly in steel to which the presence of molybdenum contributes specific desirable strength properties. Molybdenum oxide is an important source of molybdenum for alloying with steel.

Molybdenum values commonly exist in ore deposits as sulphides. Such naturally occurring mineral is called molybdenite and comprises $MoS_2$ with matrix rock and gangue. However, it also exists as an oxide, e.g. where the sulphide has been exposed to the atmosphere for long periods of time. Illustrative of such ore is molybdite comprising $MoO_3$ or a molybdate, e.g. $M_2(MoO_4)$ wherein M is monovalent metal, ammonium, or $M(MoO_4)$ wherein M is a divalent metal such as Ca.

When the molybdenum values are present substantially as a sulphide, they may be separated, after crushing and benefication, from the gangue by flotation techniques, the molybdenum sulphide being floated off leaving the gangue. However, flotation procedures have certain disadvantages; they fail to separate any oxides of molybdenum present, but leave them to be lost with the tailings; and the sulphide recovered by flotation usually contains some sulphides of W, Cu and Fe.

A need exists for a method of recovering molybdenum oxides from ore containing them. The molybdenum may be present principally as the oxides or as the oxides mixed with other molybdenum compounds, e.g. molybdenum sulphide. The invention meets this need. It provides a method of separating molybdenum oxides from ores containing molybdite or containing molybdates by an essentially single or one-step method.

The invention specifically is the method of recovering molybdenum oxides in substantially pure form from molybdenum oxychloride comprising heating said oxychloride at a temperature between about 15° C. and about 130° C. at a reduced pressure of not over about one-half atmosphere positive pressure for a time sufficient to decompose the molybdenum oxychloride to molybdenum oxides and HCl vapor, removing the HCl vapor, and retaining the molybdenum oxides as a particulate solid.

The invention encompasses the recovery of molybdenum oxides in substantially pure form by conversion of molybdenum values to molybdenum oxychloride or mixtures of such oxychlorides and thereafter heating such oxychlorides at a temperature between about 15° C. and 130° C. (preferably between about 45° C. and 115° C.) at a pressure of not over about one-half atmosphere until such oxychlorides are decomposed to molybdenum oxides and HCl vapor, removing the HCl vapor (usually promptly as formed) and recovering the molybdenum oxides, commonly by retaining them in the vessel or chamber in which the oxychlorides are being heated.

The invention, broadly, is a method of recovering molybdenum oxides, comprising: (1) roasting the molybdenum ore at a temperature between about 450° C. and 750° C. for a time sufficient to convert the molybdenum values to impure oxides, the time required being from about 1 to about 5 hours; (2) hydrochlorinating the roasted ore preferably in a fluidized bed as by passing HCl gas upwardly through a downwardly traveling bed of the roasted ore until substantially all of the molybdenum oxides have been converted to oxychlorides, e.g. $MoO_2Cl_2 \cdot H_2O$ (sometimes written $MoO_3 \cdot 2HCl$) which may also contain other compounds wherein Mo, O, and Cl are chemically combined, e.g. the anhydrous oxychloride, the oxychlorides being volatilized off during the hydrochlorination process in the effluent HCl gas stream; (3) directing the effluent gas stream into contact with a cool surface, e.g. a heat transfer surface thereby condensing the $MoO_2Cl_2 \cdot H_2O$ (unreacted HCl passing on through), (4) subjecting the oxychlorides to a reduced pressure at a temperature of between room temperature and the temperature at which the oxychlorides volatilize, a temperature between about 15° C. and 130° C. being recommended, whereby the molybdenum oxychlorides are decomposed into molybdenum oxides, (largely $MoO_3$) and HCl gas, the latter being pulled off by a more-or-less continuously applied vacuum to provide a reduced pressure. The reduced pressure so provided should be sufficient to remove the HCl but not to provide a pressure sufficiently low to result in the removal of molybdenum oxychlorides. If no reduced pressure is employed, the molybdenum oxychloride will merely distill or sublime over at the heat specified for the practice of the invention.

The molybdenum oxides recovered consist of about 98 percent $MoO_3$ and the balance largely other molybdenum oxides with only trace amounts of contaminants, e.g. Cl, Al, or W.

There is thus provided a method of separating molybdenum oxides from oxychlorides derived from molybdenum ores by a convenient simple one-step treatment thereby avoiding need for producing complex intermediate compounds or for the use of solvent extractants and more-or-less intricate equipment. Molybdenum metal may then, if desired, be recovered from the oxides so produced by a known method. One of such known methods of obtaining molybdenum metal from the oxides thereof is that described in U.S. Patent 3,196,004.

Figure 2:
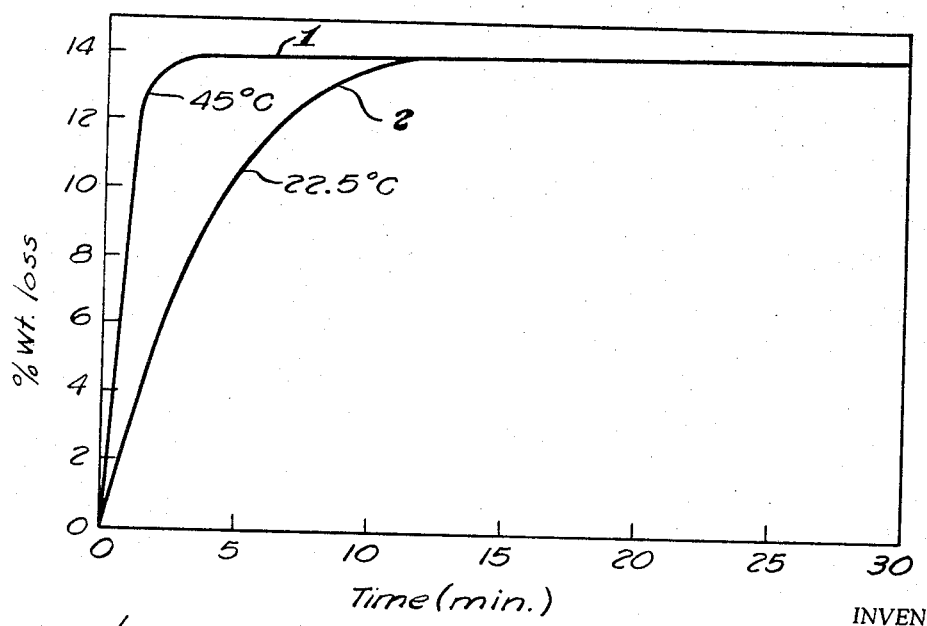

The steps of the invention will be better understood by reference to the drawing consisting of FIGURES 1 and 2.

FIGURE 1 shows a flow diagram in which the molybdate-containing ore concentrate is roasted to produce improved molybdenum oxides; the oxides so produced are treated with HCl gas to convert them to volatilized oxychlorides; the oxychlorides are condensed at reduced pressure whereby the oxychloride decomposes into HCl and substantially pure molybdenum oxides, the former being drawn out due to pressure differential, leaving the oxides.

FIGURE 2 is a graph on which is plotted the relationship between the preferred temperature range and the rate of separation of molybdenum oxides from the HCl portion of the oxychlorides. The graph shows that comparable results may be obtained at either 22.5° C. or 45° C. after about 12.5 minutes but that the separation is brought about at a more rapid rate at the higher temperature.

The practice of the invention is illustrated in its general aspects by the following examples.

Example 1

A molybdate-containing ore concentrate was roasted by subjecting it to a temperature of about 650° C. for about 3 hours thereby converting it to a dry particulate material. HCl gas was thereafter passed upwardly through the roasted ore, maintained at about 500° C. for an additional 3 hours, at a rate of HCl injection sufficiently high to maintain the bed of ore in a substantially fluidized state. The gas after passing through the bed of ore (effluent) was drawn off into a condenser consisting essentially of cooling coils positioned in a chamber whereby effluent gas which contained the molybdenum oxychlorides and their hydrates were condensed. The thus condensed oxychlorides were transferred to a weighed closed vessel which was fluid-tight and provided with a valve control and reweighed. The contents of the vessel weighed 227.9 milligrams.

The vessel was then connected to a vacuum system, heated to about 45° C., and vacuum applied for measured periods of time. After each evacuation period, the vessel was reweighed and the amount of weight loss calculated and recorded. The vacuum which was applied between each weighing was sufficient to reduce the pressure in the vessel to about 100 millimeters of mercury. Curve 1 of FIGURE 2, which shows the results obtained during the evacuation, represents the same values as those set out in the table below.

| Decomposition period at 100 millimeters of mercury pressure in minutes | Weight loss in milligrams | Weight loss in percent of original weight |
| --- | --- | --- |
| 0.0 | 0.00 | 0.00 |
| 0.5 | 12.94 | 5.68 |
| 2.0 | 31.21 | 13.69 |
| 4.0 | 32.19 | 14.12 |
| 18.0 | 33.30 | 14.61 |
| 30.0 | 33.59 | 14.74 |

Reference to the table and to FIGURE 2 shows that the decomposition is nearly complete (as evidenced by only a very small change in weight loss) after about 5 minutes at 45° C.; it shows that heating at that temperature, beyond about 30 minutes, is generally unwarranted.

The sample remaining in the vessel was examined and analyzed. It was a fine powder of faint blue tint. Analysis for chlorine showed it to contain less than 0.1 percent chlorine by weight. Examination by emission spectroscopy for metals thought to be present in the ore showed a trace of Al, but no other impurities. The sample was over 98 percent $MoO_3$ and balance substantially all of other molybdenum oxides.

Example 2

A second portion of the roasted hydrochlorinated beneficiated molybdate ore was weighed, placed in the decomposition chamber at a temperature of 22.5° C., and the chamber evacuated to a positive pressure of about 100 millimeters of mercury. The sample was periodically removed and weighed over a 30-minute period. Following each weighing the pressure was decreased to 100 millimeters of mercury during the evacuation periods. The results are shown in FIGURE 2 as curve No. 2. Reference to FIGURE 2 shows that decomposition was nearly completed after about 12.5 minutes and, as a result, thereafter decomposition continued at a slow rate until substantial completion after about 30 minutes as in Example 1 (as shown by curve No. 1 of FIGURE 2).

Analysis of the residue thus treated in the decomposition chamber gave substantially the same results as that treated in Example 1, viz. substantially all molybdenum oxides (over 98 percent by weight being $MoO_3$) with less than 0.1 percent chlorine and a trace of Al.

The invention is clearly an economical and convenient method of recovering molybdenum ores in a substantially pure form from ores comprising molybdenum oxide by conversion to molybdenum oxychloride and/or its hydrate and subjecting the oxychlorides so formed to controlled heat treatment under partial vacuum.

Examples 1 and 2 are illustrative of the practice of the invention and show its efficiency and practicality. However, they were made discontinuous for purposes of demonstration. It is to be understood that in practical ore refining operations, the preferred procedure is to combine the steps of roasting, hydrochlorination, condensation, and recovery of pure product into a continuous substantially uninterrupted process.

Having described our invention, what we claim and desire to protect by Letters Patent is:

1. The method of recovering molybdenum oxides in substantially pure form from molybdenum oxychloride comprising heating said oxychloride at a temperature between about 15° C. and about 130° C. at a reduced pressure of not over about one-half atmosphere positive pressure for a time sufficient to decompose the molybdenum oxychloride to molybdenum oxides and HCl vapor, removing the HCl vapor, and retaining the molybdenum oxides as a particulate solid.

2. The method according to claim 1 wherein said positive pressure while heating said molybdenum oxychloride is not over about 100 millimeters of mercury.

3. The method according to claim 1 wherein the temperature during the heating of said oxychloride is not less than about 45° C. nor more than about 115° C.

References Cited

UNITED STATES PATENTS

| 1,329,380 | 2/1920 | Doerner | 23—17 |
| 1,481,697 | 1/1924 | Dyson et al. | 23—17 |
| 1,911,505 | 5/1933 | Herold et al. | 23—17 |
| 3,254,945 | 6/1966 | McGrath et al. | 23—17 |

EARL C. THOMAS, *Primary Examiner.*

HERBERT T. CARTER, *Assistant Examiner.*

U.S. Cl. X.R.

23—16, 17, 87, 140